United States Patent [19]
Anani

[11] Patent Number: 5,549,989
[45] Date of Patent: Aug. 27, 1996

[54] ELECTROCHEMICAL CAPACITOR HAVING A PROTON CONDUCTING SOLID ELECTROLYTE

[75] Inventor: Anaba A. Anani, Lauderhill, Fla.

[73] Assignee: Motorola, Inc., Schaumburg, Ill.

[21] Appl. No.: 169,231

[22] Filed: Dec. 20, 1993

[51] Int. Cl.$^6$ .................................... H01M 6/18
[52] U.S. Cl. ..................... 429/193; 429/191; 429/218
[58] Field of Search .................... 429/193, 191, 429/218

[56] References Cited

U.S. PATENT DOCUMENTS

| | | | |
|---|---|---|---|
| 4,539,276 | 9/1985 | Harbach | 429/191 |
| 4,633,373 | 12/1986 | Phillips . | |
| 4,863,813 | 9/1989 | Dyer | 429/33 |
| 4,894,301 | 1/1990 | Dyer | 429/193 |
| 5,136,474 | 8/1992 | Sarangapani . | |
| 5,162,166 | 11/1992 | Ellgen | 429/30 |

FOREIGN PATENT DOCUMENTS 0078404  11/1983  European Pat. Off. .

*Primary Examiner*—George Fourson
*Assistant Examiner*—C. Everhart
*Attorney, Agent, or Firm*—Kenneth M. Massaroni; Dale W. Dorinski

[57] ABSTRACT

An electrochemical capacitor (10) stores an electrical charge from an external source (40). The capacitor has a positive electrode (30) and a negative electrode, each electrode being a metal oxide. A solid, protonically-conducting electrolyte (25) is disposed between the positive and negative electrodes and is in contact with each electrode. The electrochemical capacitor stores the electrical charge by changing the oxidation state of the metal oxide, oxidizing the metal at the positive electrode and reducing the metal at the negative electrode. The solid electrolyte is pseudoboehmite, tetramethyl ammonium hydrate, or $Li_5AlO_4$. The electrodes are transition metals capable of forming multiple oxides, but not capable of forming metal hydrides.

13 Claims, 3 Drawing Sheets

ELECTROCHEMICAL CAPACITOR HAVING A PROTON CONDUCTING SOLID ELECTROLYTE

TECHNICAL FIELD

This invention relates in general to rechargeable energy sources, and more particularly to electrochemical capacitors.

BACKGROUND

Considerable effort has been directed to the development of rechargeable batteries that have solid rather than liquid electrolytes. A solid electrolyte battery exhibits practical advantages, such as freedom from fluid leakage, but, can also exhibit low ionic conductivities. Solid electrolytes with higher ionic conductivities have been developed for the alkali metal ions, for example, sodium and lithium. However, these materials exhibit undesirable characteristics, such as very high reactivity with water. Batteries having lithium based solid electrolytes and a lithium electrode must be carefully sealed to prevent the occurrence of potentially hazardous reactions between the electrode and the moisture in the air.

Those skilled in the art will readily see the advantage of forming solid electrolyte energy sources with less reactive materials. Such an energy source would not have to be sealed and would be much more mechanically robust than prior art batteries.

Some of this effort has led to the development of electrochemical capacitor technologies engineered around proton conducting aqueous, acidic and alkaline electrolytes. In these systems, the optimum obtainable voltage is about 1.2 volts, i.e., the decomposition potential for water. Because of this limitation, research has turned to polymer based systems, such as the solid state polymer batteries and also in materials with different reversible potentials to obtain voltages higher than the aqueous systems.

It would be highly desirable and a significant contribution to the art if an energy storage device could be devised that would be free of the problems demonstrated by the alkali metal batteries and could also have a decomposition potential higher than that limited by the aqueous batteries.

SUMMARY OF THE INVENTION

Briefly, according to the invention, there is provided an electrochemical capacitor for storing an electrical charge from an external source. The capacitor has a positive electrode and a negative electrode, each electrode being a metal oxide. A solid, protonically-conducting electrolyte is disposed between the positive and negative electrodes and is in contact with each electrode. The electrochemical capacitor stores the electrical charge by changing the oxidation state of the metal oxide.

In another embodiment of the invention, the electrical charge is stored in an electrochemical capacitor having two metal oxide electrodes and a protonically-conducting electrolyte disposed between and in contact with each electrode. A source of electrical energy is connected to the electrochemical capacitor. The metal at the positive electrode is oxidized to form a different metal oxide. A hydrogen ion is transported across the electrolyte, and the metal at the negative electrode is reduced to form a different metal oxide.

In still another embodiment of the invention, a communication device comprises a radio receiver and an energy storage device electrically connected to the receiver. The energy storage device has a positive electrode and a negative electrode, each comprising a metal oxide. A solid, protonically-conducting electrolyte is disposed between the positive and negative electrodes and is in contact with each electrode. The energy storage device stores the electrical charge by changing the oxidation state of the metal oxide.

DETAILED DESCRIPTION OF THE PREFERRED EMBODIMENT

Figure 1:
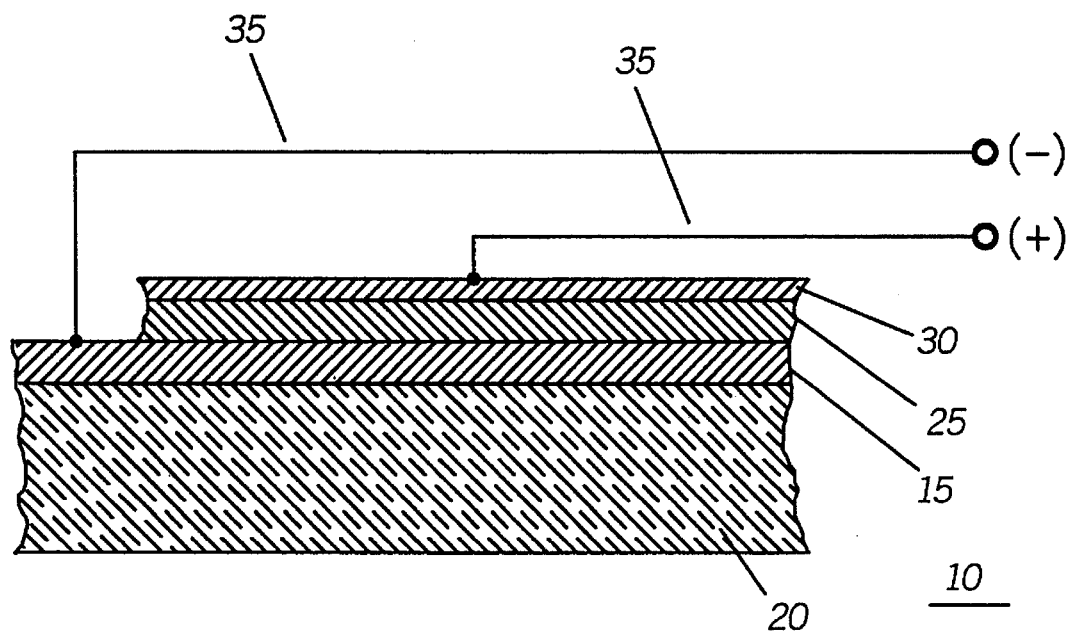
FIG. 1 is a cross-sectional view of a preferred embodiment of an electrochemical capacitor in accordance with the present invention.

This invention relates to the use of proton conducting solid electrolytes. In general, the term proton conducting is not only used to denote a material that conducts hydrogen ions but also materials that exhibit properties of positive ions, such as ammonium ions, hydronium ions, or even hydroxyl ions. Certain high conductivity materials which transport protons among donor/acceptor arrays, such as the layered hydrate $HUO_2PO_4.4H_2O$, also known as HUP, containing $H_3O^+$ ions and/or $NH_4^+$ ions decomposes at about 50° C. Recently, it has been demonstrated that some sintered oxides, based on the alkali earth metal cerates, show appreciable proton conductivities at intermediate to low temperatures. Unlike the aqueous conductors which contain protons as a major constituent and are thus liable to electrolyte failure due to proton loss, the cerates offer structural and chemical stability since the protons are not critical to the composition or structural of the oxides. This new group of materials, for example, the boehmites and wet lithium aluminum oxides, are quite useful as solid state electrolytes.

In accordance with the present invention, the solid proton conducting electrolytes included in an electrochemical capacitor are materials such as hydrated aluminum oxide. This material and techniques for its formation may be found in U.S. Pat. No. 4,863,813, incorporated herein by reference. This solid proton conducting aluminum oxide material is characterized by properties of high conductivity for hydrogen ions ($H^+$) and high resistance (at least $10^6$ Ohm-centimeters) to electrons. Such a material will, henceforth, be referred to as being protonically conducting. Depending on the particular reaction conditions involved in the formation of the hydrated aluminum oxide, the final product may be known as boehmite, pseudoboehmite, bayerire, gibbsite, or combinations of these materials. One of these materials, pseudo-boehmite, has been found to have a particularly high conductivity for hydrogen ions while having extremely low conductivity for electrons. A preferred form of the hydrated aluminum oxide electrolyte has at least 50% pseudo-boehmite; however, a solid electrolyte that has at least 95% pseudo-boehmite would be most preferred.

This boehmite structure can be formed in several ways, for example, immersing pure aluminum in boiling water, or exposing a clean metallic aluminum surface to water vapor in the temperature range of 90° to 374° C. with 90° to 100° C. being preferable. Boehmite may also be formed by reacting an alkaline solution with an aluminum salt, or an acidic solution with an aluminate. In the first case, the pure aluminum can be obtained in the form of a very thin foil or simply as a thin film prepared by any number of vacuum techniques such as sputtering evaporation and so forth.

Solid electrolyte films of the desired form can also be produced by exposing aluminum oxide to water and/or liquid vapor phases. Pseudo-boehmite form is predominate in layers produced between 90° and 100° C. Production of solid electrolyte films from anodically produced aluminum oxide films have the advantage that these films are characteristically very uniform and can be controlled to very precise thicknesses.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, the electrochemical capacitor 10 is formed by first depositing a first active electrode 15 onto a substrate 20. The electrode 15 may be formed by a number of methods, such as casting, using a sheet of metal foil, or sputtering, evaporation, etc. The electrodes typically consist of transition metals. Specifically, preferred transition metals are those capable of forming multiple oxidation states. Examples of some suitable materials would be ruthenium, rhemium, tungsten, and so on. Metals that form metal hydrides are not suitable, for example, materials such as aluminum or palladium that form aluminum or palladium hydrides. Typically, both the electrodes (15 and 30) in the electrochemical capacitor 10 are comprised of the same metal but are of different oxidation states. However, in some instances, it may be desirable to have each electrode made from a different metal oxide. A solid state protonically conducting electrolyte 25 is then deposited or coated onto the first electrode 15 to form a two layer structure. To obtain the boehmite structure, aluminum is deposited on the first electrode 15 and is either treated in the boiling water as noted above, or the aluminum deposition process is carried out in a water vapor atmosphere at appropriate temperatures. A second active electrode 30 is then deposited or coated as a third layer onto the solid state protonically conducting electrolyte 25. Appropriate current collectors 35 are attached to form the completed solid state device. Other materials suitable for use as a solid state electrolyte are NAFION®, tetra-methylammonium penta hydrate (also known as hydrated TMAH$_5$) and lithium aluminum oxide (Li$_5$AlO$_4$). This is a hydrated form of lithium aluminum oxide also known as "wet lithium aluminum oxide." Other materials may be utilized as solid protonically conducting electrolytes, but they should have the property of having waters of hydration that are easily stripped off and replaced.

With some oxides, it may be necessary to occasionally replenish the electrolyte with water in order to retain conductivity. In this case, the cell structure is constructed in such as way as to provide for a wicking arrangement. Note that a container or housing is not necessary in this design as the entire cell structure can be constructed as a sheath or stack of layers. Also, separators known to conventional battery art will not be necessary, as the boehmite layer 25 will perform the dual role of being both an electrolyte and a separator. Multiple cells can be constructed using the described cell as a repeat unit. Because these cells are also formable, designs can be constructed to conform to any desired shape.

During operation, for example, charge and discharge, the cell will behave essentially as a conventional electrochemical capacitor with the one and important difference that the ions will be transported back and forth through the solid boehmite layer rather than through an aqueous medium.

Figure 2:
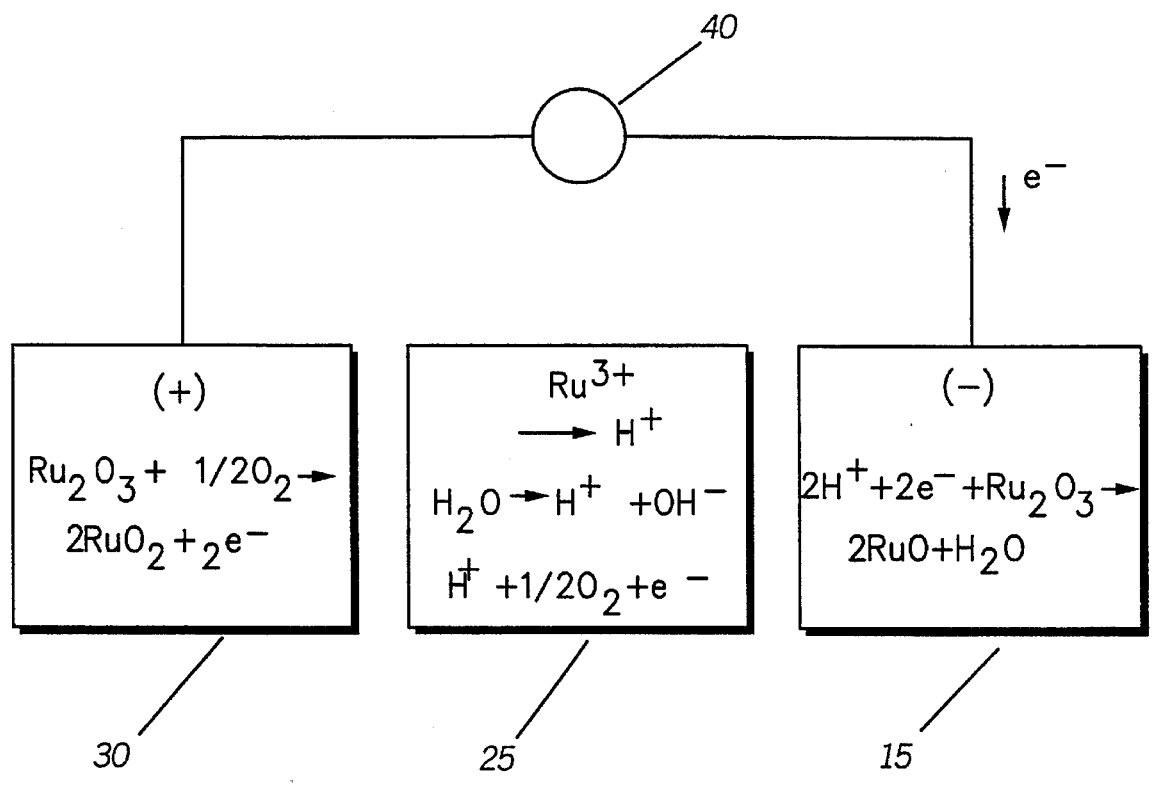
FIG. 2 is a schematic diagram of an electrochemical capacitor in accordance with the present invention.
Figure 4:
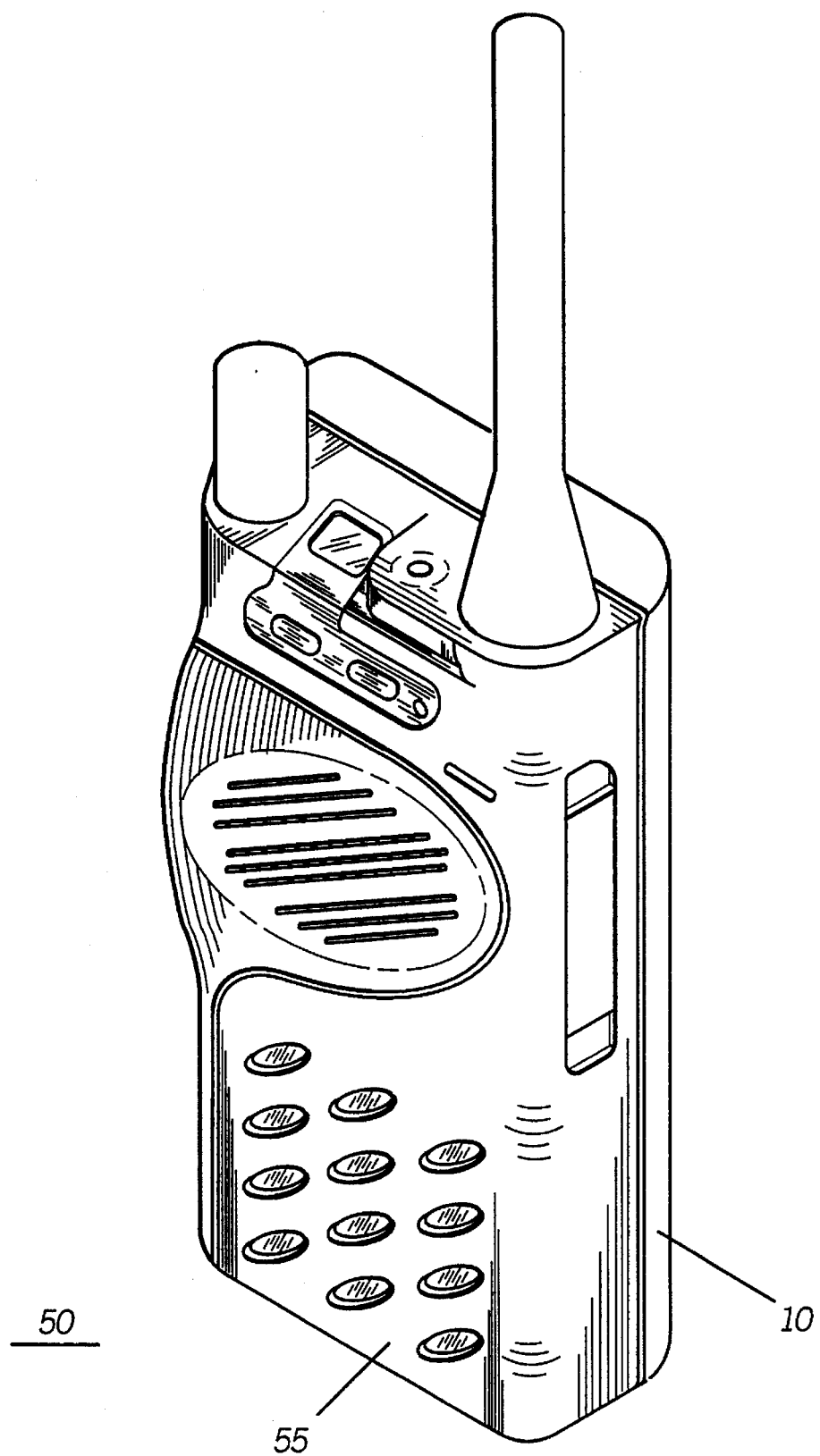
FIG. 4 is an isometric view of a communication device and an electrochemical capacitor in accordance with the present invention.

Referring now to FIG. 2, during the charging of the electrochemical capacitor, an external energy source 40 is connected to the positive 30 and the negative 15 electrodes. The energy source 40 provides a source of negative electrons to the negative electrode 15. The metal oxide at the negative electrode in a preferred embodiment being Ru$_2$O$_3$, is reduced from an oxidation state of $^+3$ to an oxidation of $^+2$.

$$2H^+ + 2e^- + Ru_2O_3 \rightarrow 2RuO + H_2O$$

At the opposite electrode 30, $$Ru_2O_3 + H_2O \rightarrow 2H^+ + 2RuO_2 + 2e^-$$

This reaction is the oxidation of the ruthenium metal from a $^+3$ state to a $^+4$ state. The solid protonically conducting electrolyte 25 transports a positive ion between the electrodes to complete the electrical cell.

In the conventional art, such as that disclosed by Dyer in U.S. Pat. No. 4,894,301, a palladium electrode is converted to palladium hydride. However, this conversion process is a bulk process and not a surface process as in the present invention. That is, the entire amount of the palladium is converted to palladium hydride. In the instant invention, only the ruthenium oxide surface is changed to a different oxidation state. When all of the available ruthenium at the surface is consumed, the reaction stops at that particular location and goes on to other available ruthenium oxides.

Figure 3:
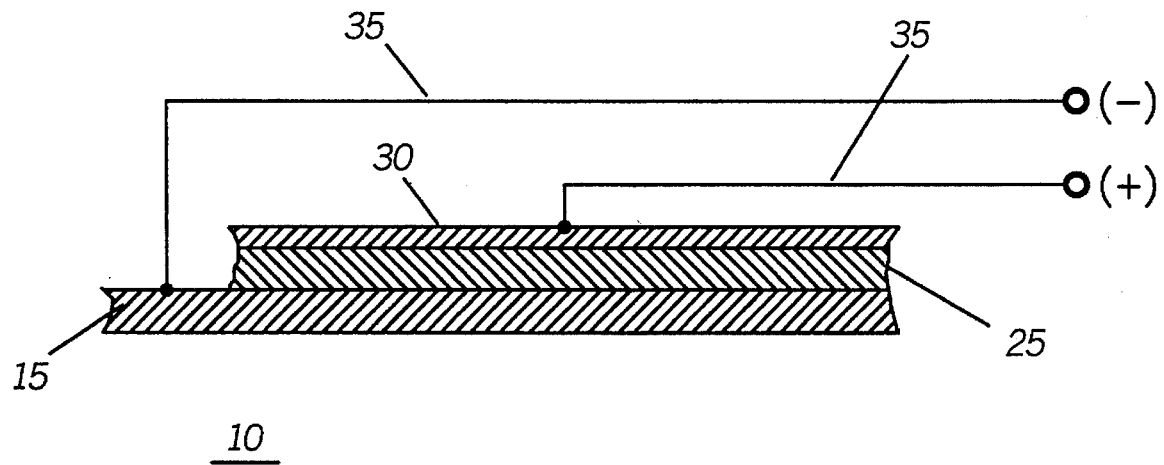
FIG. 3 is another embodiment of an electrochemical capacitor in accordance with the present invention.

Referring now to FIG. 3, the electrochemical capacitor 10 may be formed by eliminating the substrate 20. The active electrode 15 is a metal oxide species. An electrical connection 35 is made to the external environment. The solid protonically conducting electrolyte 25 is then deposited directly on the first electrode 15 and a second electrode 30 is deposited on the solid electrolyte. Another electrical connection 35 is made to the second electrode 20 and the two electrical connections are ultimately connected to a source of electrical energy to charge the capacitor. To charge the instant invention, a direct current (DC) power source is connected to the terminals and a voltage is applied. During charging, electrons flow in the external circuit to the negative electrode. Simultaneously, protons flow through the electrolyte. In response to the receipt of the electrons and protons, the metal oxides at the respective electrodes are reduced and oxidized to different oxidation states.

Once charged, the electrochemical capacitor is now capable of supplying a voltage to an external load, such as a radio, connected between the terminals of the capacitor. Once the load is so connected, protons and electrons are released by the oxide electrodes in a reaction that returns the metal oxides to their original oxidation states. More specifically, protons are released by the first electrode into the protonically conducting electrolyte and flow toward the positive electrode while electrons so released flow substantially only in the external circuit from one terminal to the next and then back to the positive electrode.

During discharge, electrons flowing to the positive electrode react with water and oxygen in the air to form hydroxyl ions. In turn, these ions combine with protons flowing through the electrolyte to the electrode to form water and thereby rehydrate the electrolyte. During discharge, the material of the electrode serves to catalyze the oxidation or reduction reactions.

In another embodiment of the invention, a communication device 50 may be formed, using this electrochemical capacitor 10. The communication device typically consists of a radio receiver 55 and an energy storage device. In this instance, the energy storage device is the electrochemical capacitor 10 with the solid protonically conducting electrolyte and transition metal oxide electrodes. It should be obvious to one skilled in the art that because of the solid state formulation of the electrochemical capacitor that the energy storage device for a radio receiver could be significantly smaller than those of the conventional art. That is to say, bulky and complicated battery packs now presently known could be replaced with a simple solid state capacitor.

From the aforementioned description, it should be clear that an electrochemical capacitor using a boehmite type electrolyte can be formed that can store energy in a renewable process. This type of capacitor avoids the problems well known in the prior art, such as hazardous reactions of the electrolyte and/or electrodes with air.. In addition, because it is a capacitor and not a battery, the energy storage profile and demand curves are significantly different than those found in batteries and may be utilized to significant advantage.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical capacitor for storing an electrical charge from an external source, comprising:
    a positive electrode and a negative electrode, each comprising a metal oxide;
    a solid, protonically-conducting electrolyte disposed between the positive and negative electrodes and in contact with each electrode, said solid protonically-conducting electrolyte selected from the group consisting of pseudoboehmite, tetramethyl ammonium pentahydrate, $Li_5AlO_4$, and combinations thereof; and
    the electrochemical capacitor capable of storing the electrical charge by changing the oxidation state of the metal oxide.

2. The electrochemical capacitor as described in claim 1, wherein the electrodes are not capable of forming the electrical charge by forming a metal hydride.

3. The electrochemical capacitor as described in claim 1, wherein the metal oxide comprises an oxide of a transition metal element.

4. The electrochemical capacitor as described in claim 3, wherein the metal oxide comprises an oxide of one or more metals selected from the group consisting of ruthenium, rhenium, and tungsten.

5. An electrochemical capacitor for storing an electrical charge provided by an external source, comprising:
    a positive electrode comprising a first metal oxide species;
    a negative electrode comprising a second metal oxide species;
    a boehmite electrolyte disposed between the positive and negative electrodes and in contact with each electrode; and
    the electrochemical capacitor capable of storing the electrical charge by reducing the metal at one electrode to form a third metal oxide species and oxidizing the metal at the other electrode to form a fourth metal oxide species.

6. The electrochemical capacitor as described in claim 5, wherein the electrodes are not capable of forming the electrical charge by forming a metal hydride.

7. The electrochemical capacitor as described in claim 5, wherein the metal oxide comprises an oxide of a transition metal element.

8. The electrochemical capacitor as described in claim 7, wherein the metal oxide comprises an oxide of one or more metals selected from the group consisting of ruthenium, rhenium, and tungsten.

9. A method for storing electrical charge in an electrochemical capacitor having two metal oxide electrodes and a protonically-conducting electrolyte disposed between and in contact with each electrode, comprising:
    providing said electrolyte as fabricated from the group consisting of pseudoboehmite, tetramethyl ammonium pentahydrate, and $Li_5AlO_4$;
    providing a source of electrical energy to the electrochemical capacitor;
    oxidizing the metal at the positive electrode to form a different metal oxide;
    transporting a hydrogen ion across the electrolyte; and
    reducing the metal at the negative electrode to form a different metal oxide.

10. The method of storing charge as described in claim 9, wherein the step of oxidizing the metal and the step of reducing the metal both comprise not forming a metal hydride.

11. The method of storing charge as described in claim 9, wherein the step of oxidizing the metal comprises oxidizing a transition metal.

12. An energy storage device for a communication device, comprising:
    an energy storage device electrically connected to the radio receiver, the energy storage device comprising:
        a positive electrode and a negative electrode, each comprising a metal oxide;
        a solid, protonically-conducting electrolyte disposed between the positive and negative electrodes and in contact with each electrode, said solid protonically-conducting electrolyte selected from the group consisting of pseudoboehmite, tetramethyl ammonium pentahydrate, $Li_5AlO_4$, and combinations thereof; and
        the energy storage device capable of storing the electrical charge by changing the oxidation state of the metal oxide.

13. A method for storing electrical charge in an electrochemical capacitor having two electrodes, each electrode comprising an oxide of a metal selected from the group consisting of ruthenium, rhenium, and tungsten, and having a protonically-conducting electrolyte selected from the group consisting of pseudoboehmite, tetramethyl ammonium pentahydrate, and $Li_5AlO_4$ disposed between and in contact with each electrode, the method comprising the steps of:
    providing a source of electrical energy to the electrochemical capacitor;
    oxidizing the metal at the positive electrode to form a different metal oxide;
    transporting a hydrogen ion across the electrolyte; and
    reducing the metal at the negative electrode to form a different metal oxide.

* * * * *